United States Patent [19]
Dunsmore et al.

[11] Patent Number: 5,389,998
[45] Date of Patent: Feb. 14, 1995

[54] CAMERA POWER SUPPLY SYSTEM

[75] Inventors: Clay A. Dunsmore, Fairport; John H. Minnick, Rochester, both of N.Y.; Christopher A. Ludden, Austin, Tex.

[73] Assignee: Eastman Kodak Company, Rochester, N.Y.

[21] Appl. No.: 46,065

[22] Filed: Apr. 8, 1993

[51] Int. Cl.⁶ .............................................. G03B 7/26
[52] U.S. Cl. ................................................... 354/484
[58] Field of Search ........................ 354/484, 412, 268

[56] References Cited

U.S. PATENT DOCUMENTS

| | | | |
|---|---|---|---|
| 4,003,063 | 1/1977 | Takahaski et al. | 354/50 |
| 4,096,496 | 6/1978 | Numata et al. | 354/60 |
| 4,387,977 | 6/1983 | Uchidoi et al. | 354/484 |
| 4,429,974 | 2/1984 | Suzuki | 354/484 |
| 4,460,264 | 7/1984 | Winter | 354/419 |
| 4,482,236 | 11/1984 | Tsuzuki et al. | 354/268 |
| 4,561,754 | 12/1985 | Matsuyama | 354/484 |
| 4,831,406 | 5/1989 | Seki et al. | 354/484 |
| 4,914,469 | 4/1990 | Ishimura et al. | 354/484 |
| 4,916,474 | 4/1990 | Miyazawa et al. | 354/412 |
| 5,032,864 | 7/1991 | Ishimura et al. | 354/484 |
| 5,053,804 | 10/1991 | Odaka et al. | 354/484 |
| 5,136,327 | 8/1992 | Ogawa | 354/484 |
| 5,138,354 | 8/1992 | Okada et al. | 354/484 |
| 5,150,147 | 9/1992 | Kobayshi et al. | 354/484 |

*Primary Examiner*—Russell E. Adams
*Attorney, Agent, or Firm*—David A. Hawley

[57] ABSTRACT

A camera power supply system includes a controller that reduces power consumption by modifying the operation of the camera system clock circuit after the completion of each exposure taking sequence. The clock circuit operation is modified either by bypassing current drains, thereby reducing the accuracy of the clock circuit as well as its power consumption, or by reducing the frequency of the clock pulses produced by the system clock. Modifying the operation of the system clock in this way does not adversely affect operation of systems such as information displays, but does reduce power consumption. The clock circuit operation is restored at the beginning of an exposure sequence.

14 Claims, 4 Drawing Sheets

CAMERA POWER SUPPLY SYSTEM

BACKGROUND OF THE INVENTION

1. Field of the Invention

This invention relates generally to electrical power supply systems for photographic cameras and, more particularly, to camera power supply systems that reduce battery drain.

2. Description of the Related Art

Many currently produced cameras include a number of operating systems that must be supplied with electrical power. The systems include information displays that can be viewed by a camera user, automatic exposure systems that set picture parameters, lens drive motors, flash units for auxiliary illumination, automatic film advance systems, and film rewind motors. Some of the systems, such as the displays, are operated substantially continuously while the camera is in an ON mode, also referred to as the active mode. Other systems, such as the film advance systems and flash units, are operated intermittently. The systems typically are operated under the control of circuitry that is implemented in integrated circuits fabricated with CMOS technology. The control circuitry generally includes a microcomputer controller and a system clock. An electrical power source, such as a camera battery, typically provides electrical power to the microcomputer and the various systems.

Some of the camera systems, especially the flash units and film advance systems, can create momentarily large fluctuations in the demand for electrical power from the power supply system. Such fluctuations can put severe loads on the camera battery and can reduce the available voltage below the operating requirements of the camera systems, adversely affecting the camera operation. Therefore, many currently produced cameras have power supply systems that include a boost circuit or a regulated power supply that receives 3-volt power from the camera battery and boosts it to produce, for example, 6-volt power. The regulated power supply ensures a steady supply of power to the various camera systems, including the displays, film advance systems, flash units, lens drive motors, and the like, even under high load conditions.

As noted above, the high-load systems are typically operated intermittently. Operation of the high-load systems is usually initiated by pressing a user-operated switch, such as a shutter button, which begins an exposure sequence. During the exposure sequence, the high-load systems are operated. A great deal of time can pass between exposure sequences. Continuously running the regulated power supply to produce boosted power can drain the camera battery and unacceptably shorten the battery lifetime.

To reduce battery drain, some cameras provide an inactive mode, also referred to as a doze mode, in which the regulated power supply is turned off. Many of these cameras include timing circuits such that the inactive mode is automatically selected if the shutter button is not operated within a predetermined time interval following an exposure taking sequence. Unfortunately, turning off the regulated power supply can extinguish the information display, to which the user may want to refer quickly before taking the next exposure. Therefore, some cameras turn off the regulated power supply in the inactive mode but leave selected low-load camera systems such as the display supplied with power directly from the camera battery. In this way, the operation of the display is not affected and battery lifetime is extended. Thus, such cameras can automatically switch between battery power and a regulated power supply or boost circuit to conserve the camera battery.

For example, the cameras described in U.S. Pat. No. 4,831,406 to Seki and U.S. Pat. No. 5,032,864 to Ishimura are switched to an inactive mode if certain user actions do not occur within a predetermined time interval following an exposure taking sequence. In the inactive mode, various camera systems are supplied with power directly from a camera battery. When a user action such as pressing a shutter button occurs, the camera is switched to an active mode in which a boost circuit is activated and the camera systems are supplied with power from the boost circuit.

Cameras with automatic selection of an inactive mode after a predetermined time interval reduce the drain on the battery that otherwise would occur from continuous operation of the boost circuit. Unfortunately, the timing circuits necessary for determining the time interval can be comparatively expensive to fabricate and themselves are a source of battery drain. It would be advantageous to reduce battery drain in the inactive period following an exposure taking sequence without affecting the operation of displays and without using costly components.

In addition to battery drain due to running the regulated power supply for extended periods of time, battery drain also can occur if battery power is provided to the information display continuously or for extended periods of time. Providing continuous or extended operation of the display provides information without requiring action by the camera user, which increases convenience but also increases battery drain. To reduce battery drain from the information display, some cameras provide an additional battery devoted exclusively to power the information display. Unfortunately, this increases the cost and size of the camera. Other cameras provide a relatively large capacitor to filter the battery voltage so as to supply a consistent voltage to the display, even under the intermittently heavy loads on the battery during an exposure sequence. This also increases the cost and size of the camera. It would be advantageous to provide continuous or extended display of information without adding to battery drain and without using components that increase cost and size.

From the discussion above, it should be apparent that there is a need for a camera power supply system that reduces battery drain between exposure sequences without affecting the operation of low-load camera systems such as displays and does not use components such as timing circuits, additional batteries, and display capacitors that increase cost and size. The present invention satisfies this need.

SUMMARY OF THE INVENTION

The present invention provides a power supply system for use in a photographic camera having a clock circuit that produces timing pulses, a user-operable switch that initiates an exposure taking sequence, an exposure taking system that operates in accordance with the timing pulses from the system clock circuit to complete the exposure taking sequence, a power supply system controller, and a power source that provides electrical power to the controller, wherein the controller selects between an active camera mode and a reduced voltage camera mode such that the controller automatically selects the reduced voltage mode at the completion of an exposure taking sequence and modifies the operation of the clock circuit in the reduced voltage mode to-reduce the consumption of electrical power from the power source.

A camera power supply system in accordance with the invention cycles between an active mode of operation and a reduced voltage mode of operation such that the active mode is initiated with the operation of a user-operable switch, such as a shutter button. A clock circuit is supplied with electrical power from a power source and a current reference signal from a controller. The clock circuit produces a pulsed clock signal that is used to operate exposure taking systems such as a shutter, a flash unit, and an exposure metering system. During the active mode, a boost circuit is supplied with power from the power source and provides boosted power to the exposure taking systems. The active mode ends with, for example, the complete recharging of the flash unit, at which time the reduced voltage mode of operation begins.

During the reduced voltage mode, the controller reduces drain on the power source by modifying the operation of the clock circuit so less power is consumed, as described further below. In addition, the exposure taking systems are not supplied with power during the reduced voltage mode, although the information display is provided with power in both modes. Thus, it is not necessary to operate the boost circuit in the reduced voltage mode. The camera active mode is restored at the next operation of the user-operable switch, which restores operation of the clock circuit. Thus, drain on the power source is reduced and no timing circuits are necessary.

In one aspect of a camera constructed in accordance with the invention, the controller modifies the operation of the clock circuit in the reduced voltage mode by providing a reduced accuracy current reference signal that requires less power to produce. The reduced accuracy current reference signal reduces the accuracy of the clock pulses, but camera operation is not affected because only systems that can operate satisfactorily with such inaccuracies are operated in the reduced voltage mode. In another aspect of the invention, the controller modifies the operation of the clock circuit by reducing the frequency of the pulsed clock signal to produce a reduced frequency signal. Pulses at the required operating frequency are provided to camera systems such as the information display through a clock divider circuit. In either aspect of the invention, the power consumption of the clock circuit is reduced during the reduced voltage mode but operation of camera systems such as displays are not adversely affected.

Other features and advantages of the present invention should be apparent from the following description of the preferred embodiments, which illustrate, by way of example, the principles of the invention.

DESCRIPTION OF THE PREFERRED EMBODIMENTS

Figure 1:
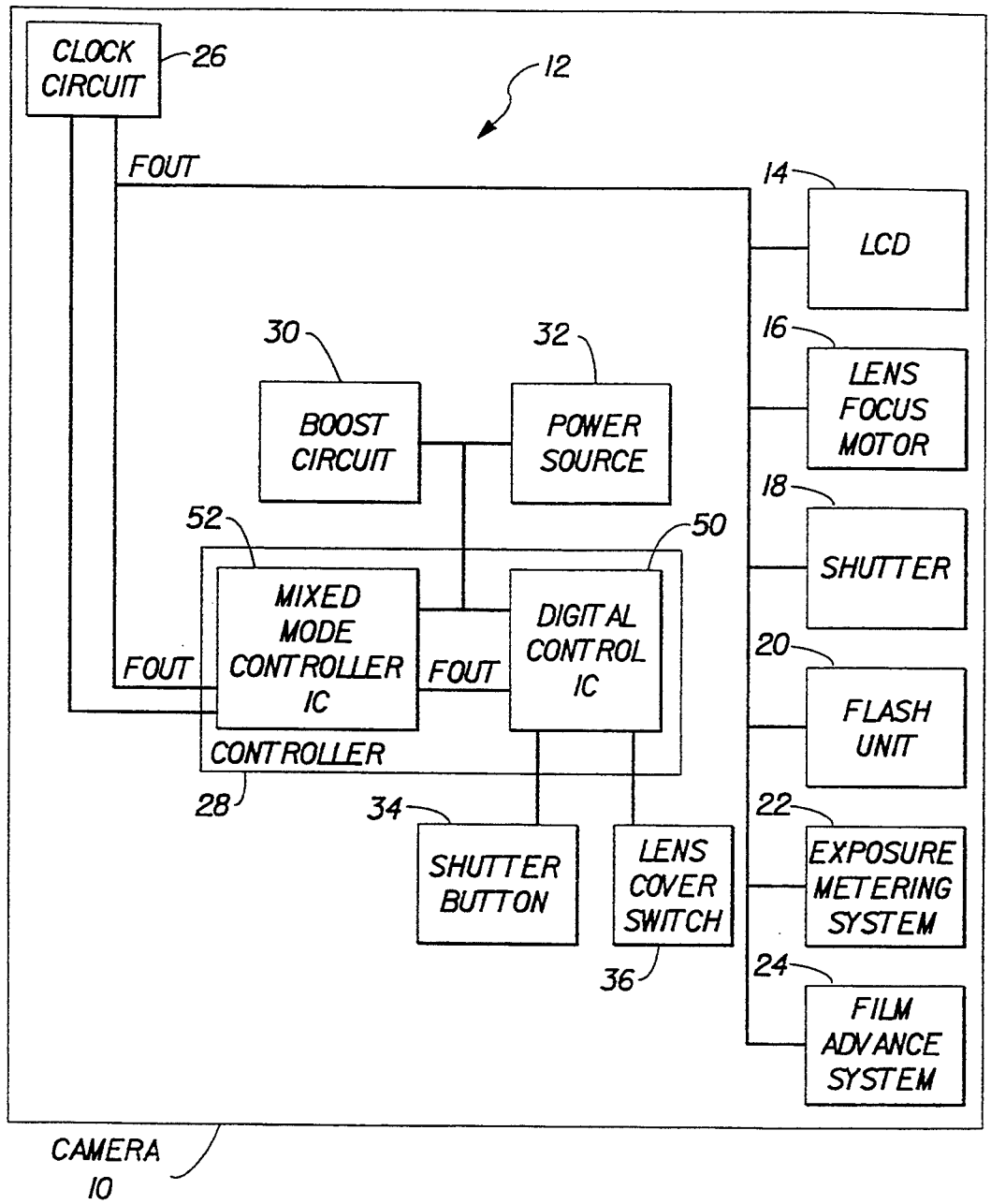
FIG. 1 is a block diagram of a camera power supply system constructed in accordance with the present invention.

With reference now to FIG. 1, a camera 10 having a power supply system 12 constructed in accordance with the present invention supplies electrical power to a variety of camera systems, such as an information display 14 and exposure taking systems including a lens focus motor 16, a shutter 18, a flash unit 20, an exposure metering system 22, and a film advance system 24. The display provides a camera user with information concerning frame number, flash condition, and the like. The display and exposure taking systems operate in accordance with timing pulses produced by a clock circuit 26. The power supply system includes a controller 28 and a boost circuit 30. The boost circuit receives electrical power from a power source, such as a battery 32, and produces regulated power for the various systems. When a user-operable switch, such as a shutter button 34, is pressed, the controller initiates an exposure taking sequence, during which one or more of the exposure taking systems are operated. After the completion of an exposure taking sequence, the controller 28 automatically selects a reduced voltage mode of operation in which it adjusts the operation of the clock circuit 26 to reduce the consumption of power from the battery without affecting operation of the display 14. When the shutter button is next pressed, operation of the clock circuit is restored and another exposure taking sequence is initiated. In this way, the camera user detects no change in the operation of the display between exposures, and drain on the battery 32 is reduced.

In normal operation, the controller 28 receives a signal from a camera on/off switch to indicate whether a user has placed the camera in an "OFF" condition or in an "ON" condition. In the preferred embodiment, the camera on/off switch comprises a lens cover switch 36, which provides an ON signal when a camera lens cover is open and provides an OFF signal when the lens cover is closed. When the camera is in the OFF condition, the power supply system 12 does not provide electrical power to any of the other systems. In this way, the lens cover switch can be used to activate and deactivate the camera.

As noted above, in the ON condition, the controller 28 receives a signal from the shutter button 34 to end the reduced voltage mode of operation and restore normal operation of the boost circuit 30 and clock circuit 26. When the shutter button is pressed, the controller 28 activates the boost circuit 30 such that the boost circuit receives three-volt power from the power source 32 and boosts it to six-volt power. The controller also responds to the pressing of the shutter button by activating the shutter 18, the flash unit 20, the exposure metering system 22 and, following the completion of an exposure, the film advance system 24.

In particular, when the lens cover switch 36 initiates the ON condition and the camera user presses the shutter button 34, an exposure taking sequence is begun. During the exposure taking sequence, the controller 28 regulates the power from the boost circuit 30 and provides the proper voltage to the various camera systems, including the lens motor 16, the shutter 18, the flash unit 20, the exposure system 22, and the film advance system 24. These systems, in turn, drive the camera lens, actuate the shutter, charge the flash unit, and advance the camera film. The controller 28 also operates the clock circuit 26 to provide timing pulses to the systems during the exposure taking sequence. The exposure taking sequence is completed when a predetermined action associated with taking an exposure is completed. In the preferred embodiment, the exposure taking sequence is completed when the film advance system has stopped and the flash unit has fully charged.

The information display 14, which can comprise, for example, a liquid crystal display (LCD), receives electrical power from the boost circuit 30 via the controller 28 during an exposure taking sequence and receives power from the power source 32 via the controller during the reduced voltage mode. Alternatively, the display can receive power from the power source both during the active mode and the reduced voltage mode. In both modes, the display receives timing pulses from the clock circuit 26. These timing pulses are necessary for proper operation of the display. In this way, the information display is constantly illuminated and provides information to the camera user as long as the camera ON condition is prompted by the lens cover switch 36.

At the completion of an exposure taking sequence, the controller 28 automatically initiates the reduced voltage mode. In the reduced voltage mode, the controller turns off the boost circuit 30 and modifies the operation of the clock circuit 26 such that drain on the battery 32 is reduced. Turning off the boost circuit 30 eliminates a source of battery drain and effectively disables the lens motor 16, shutter 18, flash unit 20, exposure metering system 22, and film advance system 24. The modification to the operation of the clock circuit can comprise, for example, reducing the current drawn by the clock circuit by turning off current drains within the clock circuit that ensure relatively high accuracy timing pulses.

The relatively high accuracy timing pulses ordinarily produced by the clock circuit 26 comprise, for example, a pulsed signal FOUT having pulses that are produced at a frequency within plus or minus 5% of a nominal clock frequency. In the reduced voltage mode, the modification to the operation of the clock circuit produces timing pulses, for example, within plus or minus 25% of the nominal frequency. The reduced accuracy of the signal FOUT does not affect the operation of the camera because, in the reduced voltage mode, camera systems for which timing is critical, such as the shutter 18 and flash unit 20, are not operated. In the reduced voltage mode, the only systems operated are those that do not require timing pulses with relatively high accuracy but that can operate within plus or minus 25% of a nominal frequency, systems such as the information display 14. In this way, the current drawn by the clock circuit 26 is reduced from a range of approximately 100 to 200 microamps to approximately 15 microamps.

Figure 2:
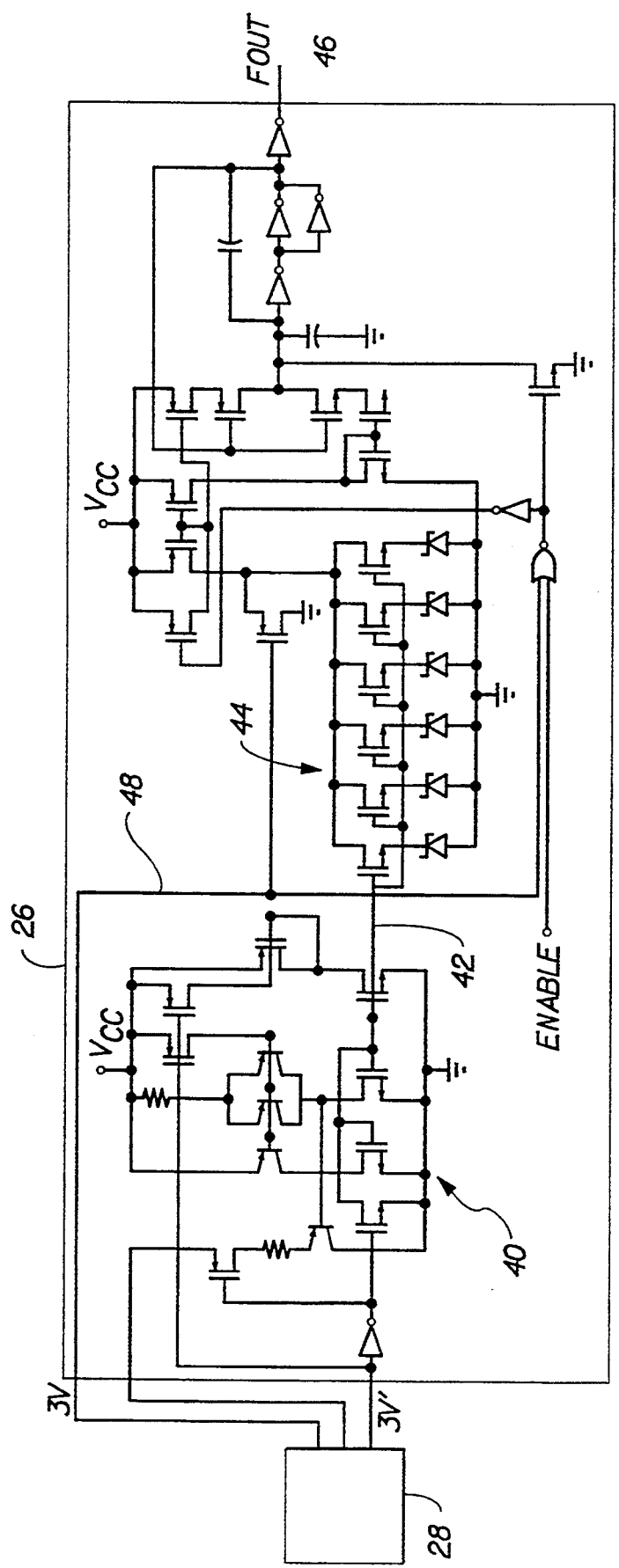
FIG. 2 is a circuit diagram of the camera power supply system illustrated in FIG. 1.

FIG. 2 shows in greater detail the difference in operation of the clock circuit 26 in the active mode and in the reduced voltage mode. The controller 28 ordinarily produces a mode signal "3V" that is high when the reduced voltage mode is desired. As illustrated in FIG. 2, when the signal 3V is low (that is, the inverse signal 3V' is high), a bias current generating network 40 is activated that, in turn, produces a bias current that is provided via an output line 42 to an oscillator network 44 that then produces the clock output signal FOUT at the clock output line 46. When the reduced voltage mode is desired, the signal 3V is high and is provided to the oscillator network via a signal line 48, while the inverse signal 3V' is low and the bias current generating network 40 is deactivated. Deactivating the bias current generating network significantly reduces the current drawn by the clock circuit and reduces the accuracy of the signal FOUT as described above. The details of the circuit components of the clock circuit 26 necessary to produce the signal FOUT should be known to those skilled in the art and are not shown in FIG. 2.

With reference again to FIG. 1, the controller 28 preferably is comprised of a digital controller integrated circuit (IC) 50 and a mixed mode controller IC 52. In the preferred embodiment, the digital controller IC can be manufactured using a relatively small (approximately 1.5 micron) fabrication process using CMOS devices that is comparatively economical. In contrast, the mixed mode controller IC, which receives both digital and analog signals, must be constructed using a more complicated, large (approximately 3.0 micron) fabrication process using bi-CMOS devices that is not as economical as the small micron fabrication process. Thus, the number of signals designated for the mixed mode controller IC 52 is minimized so as to minimize the size of the IC and reduce the need for using the larger fabrication process. In this way, some cost savings is obtained by providing the controller 28 as a combined digital controller IC 50 and a mixed mode controller IC 52.

Figure 3:
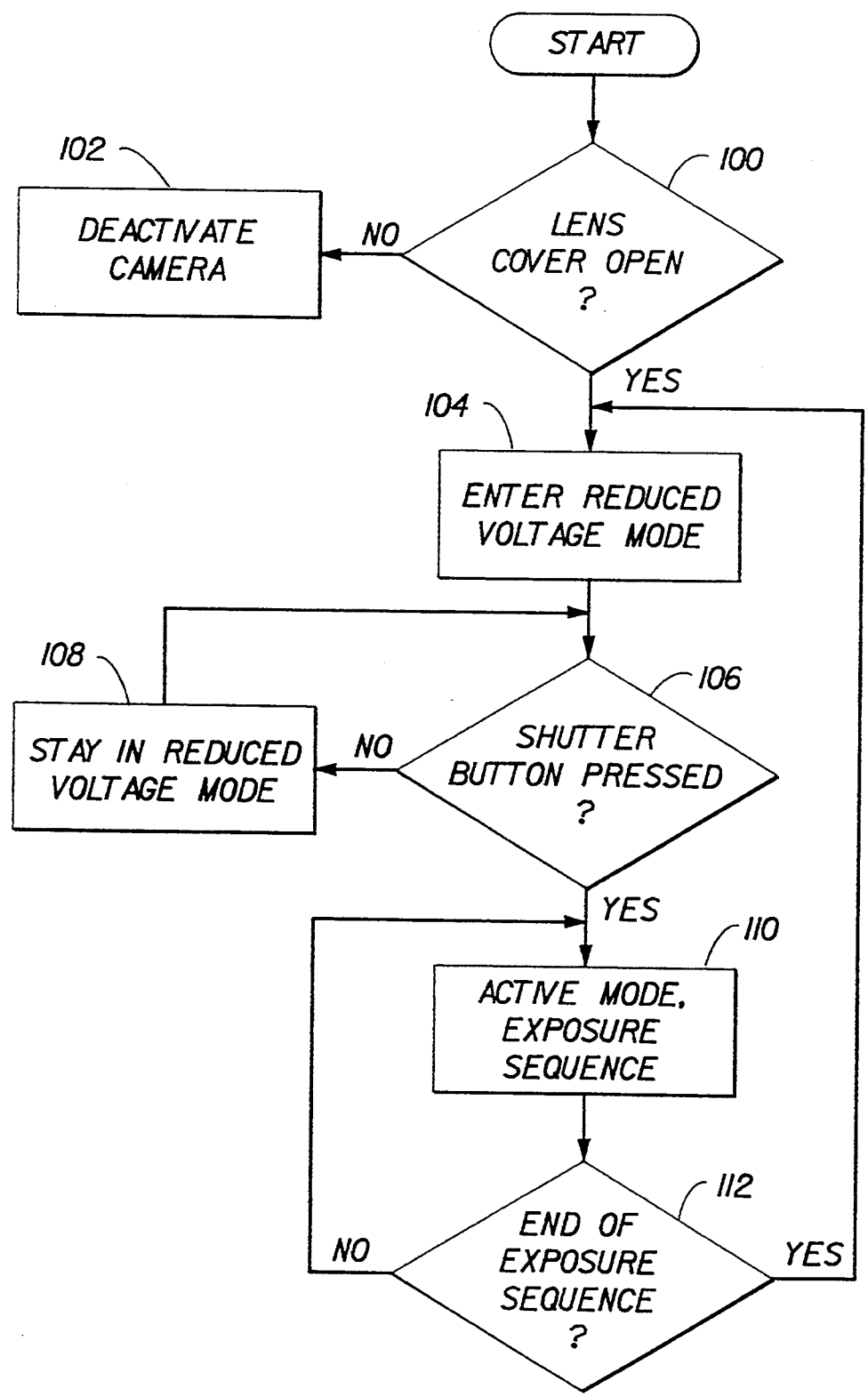
FIG. 3 is a flowchart of the operation of the power supply system illustrated in FIG. 1.

A better understanding of the operation of a camera constructed in accordance with the present invention can be gained with reference to the flowchart of FIG. 3. As noted above, the camera is placed in an ON condition when the lens cover switch 36 (FIG. 1) provides a signal indicating that the lens cover is open. Therefore, the condition of the lens cover switch is checked at the flowchart block numbered 100. If the lens cover is not open, then the camera is deactivated and placed in an OFF condition (block 102). If the lens cover is open, the camera is placed in the reduced voltage mode (block 104). The camera next waits for activation of the shutter button. That is, the camera checks for activation of the shutter button at block 106 and, if the shutter button is not pressed, the camera remains in the reduced voltage mode (block 108). If the shutter button 34 (FIG. 1) is pressed, then the reduced voltage mode is ended, the active mode begins, and the camera initiates an exposure taking sequence at the flowchart block numbered 110. The exposure taking sequence includes operating the exposure system, operating the shutter, triggering the flash unit, operating the film advance system, and charging the flash unit. The exposure taking sequence is continued (block 112) if any one of these operations is in progress and ends when the flash unit is recharged. At the completion of the exposure taking sequence, the camera enters the reduced voltage mode again at block 104 and waits for activation of the shutter button.

Figure 4:
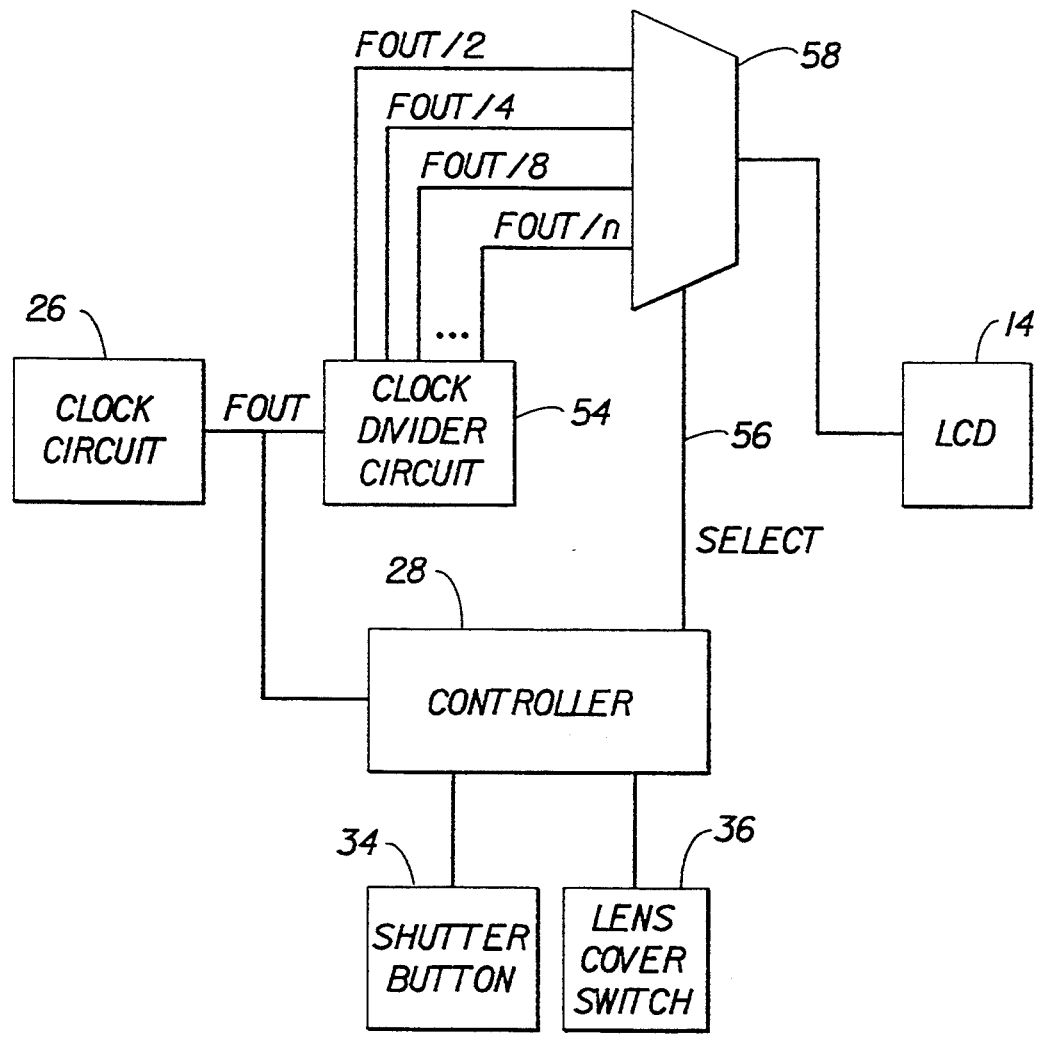
FIG. 4 is a circuit diagram of an alternative power supply system that operates in accordance with the flowchart illustrated in FIG. 3.

As described above in connection with FIG. 2, the power consumption of the clock circuit 26 can be reduced by turning off current drains in a network that produces relatively high accuracy pulses. Other arrangements for reducing the clock circuit power consumption can be used, such as reducing the operating frequency of the clock circuit or reducing the operating voltage of the clock circuit. For example, in an alternative embodiment illustrated in FIG. 4, the power consumption of the clock circuit 26 is reduced by reducing the frequency of the FOUT signal timing pulses produced by the clock circuit, rather than by reducing the accuracy of the FOUT signal timing pulses. It is known that the power consumed by a CMOS-type device is directly proportional to the frequency at which the device is operated. In the preferred embodiment, the clock circuit is implemented as an integrated circuit CMOS-type device. Therefore, reducing the operating frequency of the clock circuit reduces the frequency of the FOUT signal timing pulses and reduces the power consumption of the timing circuit 26.

As noted above, the information display 14 requires timing pulses within a relatively broad range of plus or minus 25% about a nominal frequency for proper operation. In the FIG. 4 embodiment, the reduction in the frequency of the FOUT signal during the reduced voltage mode can be beyond the broad range tolerated by the display. Therefore, the frequency of the timing signal to the display is restored to approximately the proper nominal frequency by a divider circuit 54. The divider circuit provides a variety of output signals comprising frequencies that are multiples of the FOUT signal, such as FOUT/2, FOUT/4, FOUT/8, . . . , FOUT/n. The controller 28 selects the appropriate frequency multiple signal by sending a frequency selection signal identified as "SELECT" in FIG. 4 via a signal line 56 to a multiplexer 58 that is provided with the divider circuit output signals.

The multiplexer 58 permits flexibility in constructing the clock circuit 26, so that the frequency required by the information display 14 is not necessarily the frequency FOUT. For example, if normal operation of the information display requires clock signals having a frequency of FOUT/8 and the clock circuit operating frequency is reduced by a factor of four in the reduced voltage mode, then the frequency selection signal SELECT produced by the controller 28 selects the FOUT/2 frequency signal from the multiplexer 58 and provides it to the information display 14. The remaining systems that are not operated in the reduced voltage mode, such as the lens focus motor 16, shutter 18, flash unit 20, exposure metering system 22, and film advance system 24, can be provided with the FOUT signal directly from the clock circuit 26 or from the controller 28, or can be supplied with an FOUT multiple through associated divider circuits, as appropriate. As previously described, normal operation of the power supply 12 and the clock circuit 26 is restored by pressing the shutter button 34. In this way, the information display receives timing pulses during the reduced voltage mode at approximately the proper frequency for operation so the camera user notices no change in the appearance of the display, even while the power consumption of the clock circuit 26 is reduced by a factor of four.

As noted above, the power consumption of the clock circuit 26 also can be reduced by reducing the circuit operating voltage. It is known that the power consumed by a CMOS-type device is proportional to the square of the voltage at which the device is operated. In particular, if the operating voltage of a CMOS-type device is reduced by one-half, then the power consumed by the device is reduced to one-fourth of the previous consumption. The abilities of those skilled in the art should be sufficient to adapt the embodiments discussed above for reduced voltage operation, making description of the adaptations unnecessary.

The present invention provides a camera power supply system that reduces power consumption and resulting battery drain beyond that achieved with systems that disconnect boost circuits after predetermined intervals of inactivity. The reduction is achieved without adding timing circuits and without affecting operation of systems such as information displays, which camera users would prefer to have continuously available. In this way, camera operating convenience is increased, operating cost is reduced, and increased camera production costs are avoided.

Other alternatives to the described embodiments will occur to those skilled in the art. The present invention has been described above in terms of presently preferred embodiments so that an understanding of the present invention can be conveyed. There are, however, many configurations for camera power supply systems not specifically described herein, but with which the present invention is applicable. The present invention should therefore not be seen as limited to the particular embodiments described herein, but rather, it should be understood that the present invention has wide applicability with respect to camera power supply systems in a variety of applications. All modifications, variations, or equivalent arrangements that are within the scope of the attached claims should therefore be considered to be within the scope of the invention. The following reference numerals are associated with corresponding elements in the drawings:

camera, 10
camera power supply, 12
information display, 14
lens focus motor, 16
shutter, 18
flash unit, 20
exposure metering system, 22
film advance system, 24
clock circuit, 26
controller, 28
boost circuit, 30
battery, 32
shutter button, 34
lens cover switch, 36
bias current generating network, 40
output line, 42
oscillator network, 44
clock output line, 46
digital controller integrated circuit (IC), 50
mixed mode controller IC, 52
divider circuit, 54
signal line, 56
multiplexer, 58

We claim:

1. A camera power supply system for use in a photographic camera, comprising:
   a clock circuit that produces timing pulses;
   a user-operable switch that initiates an exposure taking sequence;
   an exposure taking system that operates in accordance with the timing pulses from the system clock circuit to complete the exposure taking sequence;
   a power supply system controller; and
   a power source that provides electrical power to the controller, said controller including means for selecting between an active camera mode and a reduced voltage camera mode, said selecting means automatically selecting the reduced voltage mode at the completion of an exposure taking sequence and modifying the operation of the clock circuit in the reduced voltage mode to reduce the consumption of electrical power from the power source, the modification to the clock circuit operation in the reduced voltage camera mode including reducing the accuracy of the timing pulses.

2. A power supply system as defined in claim 1, wherein the clock circuit produces the timing pulses in accordance with a current reference signal from the controller and in the reduced voltage camera mode the controller provides a reduced accuracy current reference signal.

3. A power supply system as defined in claim 1, wherein the modification to the clock circuit operation in the reduced voltage camera mode comprises reducing the operating speed of the clock circuit such that it produces timing pulses at a reduced frequency.

4. A power supply system as defined in claim 1, further comprising:
a boost circuit, said exposure taking system receiving electrical power from said boost circuit and the controller permitting the boost circuit to operate in the active camera mode.

5. A power supply system as defined in claim 1, wherein the controller selects the reduced voltage camera mode after the completion of an exposure taking sequence and selects the active mode when the user-operable switch is operated.

6. A power supply system as defined in claim 5, wherein the modification to the clock circuit operation in the reduced voltage camera mode comprises reducing the accuracy of the timing pulses.

7. A power supply system as defined in claim 6, wherein the clock circuit produces the timing pulses in accordance with a current reference signal from the controller and in the reduced voltage camera mode the controller provides a reduced accuracy current reference signal.

8. A power supply system as defined in claim 6, wherein the modification to the clock circuit operation in the reduced voltage camera mode comprises reducing the operating speed of the clock circuit such that it produces timing pulses at a reduced frequency.

9. A power supply system as defined in claim 6, wherein the exposure taking system receives electrical power from a boost circuit and the controller permits the boost circuit to operate in the active camera mode.

10. An electrical power supply system for use in a photographic camera having a camera-on switch operable to place the camera in an ON condition, a shutter operation switch that initiates an exposure sequence, a plurality of camera operating systems, and a system clock that produces high accuracy timing pulses for controlling the operation of the operating systems, wherein the power supply system includes:

a power source that provides electrical power at a first voltage;
a boost circuit that receives electrical power from the power source at the first voltage and operates to boost it to produce electrical power at a second voltage; and
a controller that responds to completion of an exposure sequence by automatically modifying the operation of the system clock to reduce the power consumed by the system clock and responds to a next activation of the shutter operation switch in the ON condition by restoring operation of the system clock, wherein the modification to the system clock operation comprises reducing the accuracy of the timing pulses produced by the system clock.

11. A power supply system as defined in claim 10, wherein the modification to the system clock operation comprises reducing the frequency of the timing pulses.

12. A photographic camera comprising:
an electrical power source;
a regulated power supply that receives electrical power from the power source at a first voltage and produces electrical power at a second voltage;
a camera system that receives electrical power from the regulated power supply;
a camera information display;
a system clock that produces timing pulses that are provided to the camera system and the camera information display;
a user-operable switch that initiates an exposure sequence, including operation of the camera system, when operated by a user; and
a controller that automatically modifies the operation of the system clock after the completion of the exposure sequence to reduce the electrical power consumed by the system clock and then restores the operation of the system clock when the user-operable switch is next operated, wherein the controller modifies the system clock operation by reducing the accuracy of the timing pulses.

13. A camera as defined in claim 12, wherein the controller modifies the system clock operation by reducing the clock frequency.

14. A camera as defined in claim 12, wherein the controller prevents the regulated power supply from producing electrical power at the second voltage after the completion of the exposure sequence and then permits the regulated power supply to produce electrical power at the second voltage when the user-operable switch is next operated.

* * * * *